United States Patent
Kuespert (12)

(10) Patent No.: US 6,228,146 B1
(45) Date of Patent: May 8, 2001

(54) GAS RECOVERY DEVICE

(76) Inventor: Don R. Kuespert, 113 Thissell La., Centreville, DE (US) 19807

(*) Notice: Subject to any disclaimer, the term of this patent is extended or adjusted under 35 U.S.C. 154(b) by 0 days.

(21) Appl. No.: 09/518,353

(22) Filed: Mar. 3, 2000

(51) Int. Cl.[7] .......................... B01D 53/22; B01D 19/00
(52) U.S. Cl. ............................ 95/46; 96/6; 96/8; 96/9; 96/14; 166/105.5
(58) Field of Search .................... 95/46; 96/4, 6, 96/8–10, 12–14; 166/105.5, 265, 369

(56) References Cited

U.S. PATENT DOCUMENTS

| | | |
|---|---|---|
| 1,603,874 | 10/1926 | Scott et al. |
| 2,734,592 * | 2/1956 | Jones ........................................ 96/8 |
| 2,961,062 * | 11/1960 | Hunter et al. ............................ 96/8 |
| 3,246,450 * | 4/1966 | Stern et al. ........................... 96/8 X |
| 3,735,562 * | 5/1973 | Mousseau, Jr. et al. ................. 96/6 |
| 3,953,566 | 4/1976 | Gore ................................... 264/288 |
| 4,074,763 | 2/1978 | Stevens .............................. 166/325 |
| 4,171,017 | 10/1979 | Klass ................................... 166/266 |
| 4,230,463 | 10/1980 | Henis et al. ............................ 55/16 |
| 4,231,767 | 11/1980 | Acker ................................... 55/186 |
| 4,330,306 | 5/1982 | Salant .................................. 55/159 |
| 4,377,208 | 3/1983 | Elliott et al. ........................ 166/265 |
| 4,468,235 * | 8/1984 | Hill ..................................... 96/6 X |
| 4,482,234 | 11/1984 | Martin et al. ......................... 55/158 |
| 4,515,608 | 5/1985 | Clegg .................................. 55/193 |
| 4,539,113 * | 9/1985 | Tomita et al. ........................ 96/6 X |
| 4,636,307 * | 1/1987 | Inoue et al. .......................... 96/6 X |
| 4,670,145 * | 6/1987 | Edwards ............................... 96/8 X |
| 4,671,809 * | 6/1987 | Taketomo et al. ...................... 96/8 |
| 4,806,135 | 2/1989 | Siposs ................................ 55/204 |
| 4,886,528 | 12/1989 | Aaltonen et al. ..................... 55/158 |
| 4,985,055 * | 1/1991 | Thorne et al. ........................... 96/6 |
| 5,205,841 * | 4/1993 | Vaiman ................................. 95/46 |
| 5,227,063 | 7/1993 | Langerak et al. ................ 210/321.78 |
| 5,240,073 | 8/1993 | Bustamante et al. ................. 166/265 |
| 5,333,684 | 8/1994 | Walter et al. .......................... 166/54 |
| 5,366,011 | 11/1994 | Jennings, Jr. ....................... 166/265 |
| 5,468,283 * | 11/1995 | French et al. ........................ 96/8 X |
| 5,522,917 | 6/1996 | Honda et al. .......................... 95/46 |
| 5,653,286 | 8/1997 | McCoy et al. .................... 166/105.5 |
| 5,673,752 | 10/1997 | Scudder et al. ..................... 166/265 |
| 5,693,230 | 12/1997 | Asher ................................. 510/650 |
| 5,695,545 | 12/1997 | Cho et al. ............................... 96/46 |
| 5,762,684 * | 6/1998 | Hayashi et al. ..................... 95/46 X |
| 5,816,326 | 10/1998 | Slater ................................. 166/369 |
| 5,876,604 | 3/1999 | Nemser et al. ....................... 210/634 |
| 5,888,275 | 3/1999 | Hamasaki et al. ....................... 96/6 |
| 5,989,318 * | 11/1999 | Schroll ............................... 95/46 X |

FOREIGN PATENT DOCUMENTS

| | | | |
|---|---|---|---|
| 1-215312 * | 8/1989 | (JP) | ........................................ 95/46 |
| 1-270909 * | 10/1989 | (JP) | .......................................... 96/6 |
| 3-278805 * | 12/1991 | (JP) | .......................................... 96/6 |

* cited by examiner

Primary Examiner—Robert H. Spitzer
(74) Attorney, Agent, or Firm—Jeffrey C. Lew (57) ABSTRACT

A gas recovery device utilizes membranes of a gas permeable, liquid impermeable substance to strip gas from gas-containing liquids, such as brine in subterranean geological formations. The device includes a shell defined by perforated outer walls and a plurality of elongated permeation tubes. Only one end of the tubes is attached to a plenum with the tube lumina in fluid communication with the plenum. The remainder of the tubes is not anchored and therefore is free to move. Substantially liquid-free gas is removed from the plenum through a pipe to a remote facility for storage and use. The gas recovery device can be deployed within the casing of a well suspended by the product discharge pipe and immersed in gas-containing brine flowing from a natural geological formation. The brine seeps into the well casing and flows through the perforations to surround the permeation tubes. Gas from brine in contact with the gas permeable membrane surface transports into the tube lumina, collects in the plenum and is displaced through the discharge pipe for use at a remote location. The movement of the free ends of the tubes provides agitation within the shell effective to disturb the boundary conditions at the surface of the membrane thereby promoting transport of gas through the membrane.

31 Claims, 7 Drawing Sheets

GAS RECOVERY DEVICE

FIELD OF THE INVENTION

This invention relates to a membrane separation device for recovering gas from gas-liquid mixtures and solutions. More specifically, it relates to recovery of natural gas or gaseous mixtures from solutions of gas dissolved in water.

BACKGROUND AND SUMMARY OF THE INVENTION

The demand for gases primarily for energy value and as chemical process raw materials remains strong. Due to tremendous past and ongoing consumption, many of the more easily tapped underground gas formations have matured or even become depleted. Some significant reserves of subterranean gas have been identified but access to them is often restricted by harsh climactic and geographical conditions and production may be further limited by political constraints. Hence, there is a keen commercial interest to recover gas from previously identified, low yielding or partially depleted sources.

Gas in subterranean formations is frequently found mixed with liquid, typically oil and/or water. Under pressure existing in typical gas-yielding formations, the gas is usually dissolved in the liquid and needs to be separated therefrom. Traditional separation processes are usually operated above ground. The energy needed to pump large quantities of gas-bearing water to the surface and to carry out separation can be prohibitively expensive. Furthermore, the disposal of water waste from the separation adds to the cost and can be deleterious to the environment. Cost can be particularly critical in the recovery of gas from low-yielding formations or of the sometimes significant amount of residual gas in previously produced wells. If the cost of obtaining gas becomes too high relative to the value of the gas, producers will abandon a well even though substantial gas remains unrecovered in the formation.

Substantial effort has been dedicated to developing capability to separate gas from liquid in the well and thereby avoid the need to extract, treat and dispose of the liquid. For example U.S. Pat. No. 4,231,767 to Acker discloses a downhole liquid-gas separator having an inverted conical convoluted fine mesh screen in a tubular housing. A liquid-gas mixture enters the housing near the lower apex end of the screen which is of a mesh size selected so that liquid pumps through the screen and gas bubbles channel upward into troughs between screen convolutions. This apparatus is chiefly directed to separating gas from crude oil in oil-producing wells.

U.S. Pat. No. 5,653,286 to McCoy et al. discloses a downhole gas separator aimed at effectively pumping gas-free crude oil from a well. The separator has a tubular body and a decentralizer mounted to one side for driving the opposite side of the body against an interior wall of the well casing. The separator operates on the principle that substantially gas-free liquid will flow in the narrow gap between the opposite side and the casing to be pumped away while gas bubbles flow in the wide gap between the casing wall and the tubular body.

In recent years membrane separation process technology directed toward separating gas mixed with water in wells has developed. U.S. Pat. No. 4,171,017 to Klass teaches a method of separating and recovering methane and other similar fuel components from brine in geopressurized geothermal zones by immersing gas permeable membranes selective for the fuel components in the brine, permitting the fuel components to permeate the membranes while rejecting the brine, and collecting the fuel components.

U.S. Pat. No. 5,673,752 of Scudder et al. discloses an apparatus for separating gas from well fluid solutions which employs a hydrophobic membrane filter element that is permeable to gas but impermeable to water. The apparatus is positioned in a well bore at a depth where hydrostatic pressure allows the gas to bubble out of solution.

Despite great advances in the art represented by the examples cited above, there still remains a need to easily and inexpensively recover substantially water-free gas from subterranean gas producing formations. There is particularly great need for a way to readily harvest residual gas from low-yielding formations, i.e., those having relatively large amounts of water mixed with gas. Accordingly, the present invention provides a gas recovery device comprising a plenum defining a chamber adapted to contain a gas, at least one permeation unit comprising a gas permeable, liquid impermeable membrane and having an elongated shape defining two ends and an internal cavity adapted to receive gas transported through the membrane and which permeation unit is affixed to the gas recovery device only at one of the two ends which end is operative to transfer gas from the internal cavity to the chamber, and a gas transfer pipe in fluid communication with the chamber and extending away from the plenum. Preferably, the permeation unit has an elongated configuration and is composed of material adapted to permit the permeation unit to flex along its axis of elongation without occluding the internal cavity. Thus, the permeation unit is free to move about and this movement disturbs the permeation boundary conditions so as to enhance the permeation of the gas through the membrane. There is also provided an apparatus comprising a plurality of gas recovery devices strung together.

This invention additionally provides a novel method of separating gas from a fluid of gas and liquid in intimate mutual contact comprising the steps of providing a gas recovery device comprising a plenum defining a chamber adapted to contain a gas, at least one permeation unit comprising a gas permeable, liquid impermeable membrane and having an elongated shape defining two ends and an internal cavity adapted to receive gas transported through the membrane and which permeation unit is affixed to the gas recovery device only at one of the two ends which end is operative to transfer gas from the internal cavity to the chamber, and a gas transfer pipe in fluid communication with the chamber and extending away from the plenum immersing the gas recovery device in the fluid of gas and liquid thereby permitting the fluid to contact one side of the membrane, maintaining contact of the fluid with the membrane to selectively transport gas substantially free of liquid through the membrane into the internal cavity, allowing the gas transported through the membrane to flow into the plenum, and removing the gas through the pipe.

DETAILED DESCRIPTION

Figure 1:
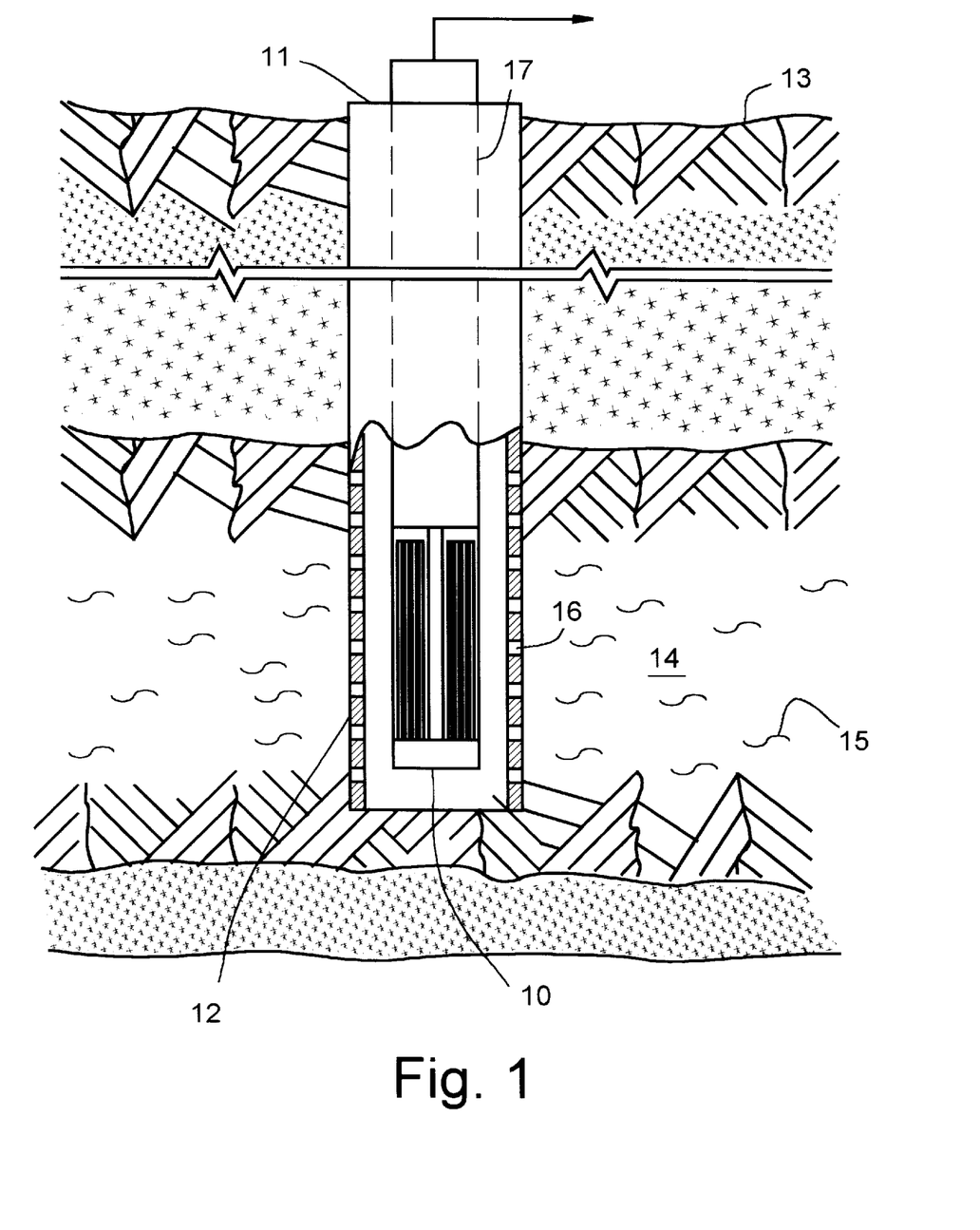
FIG. 1 is a schematic diagram of a gas recovery system according to this invention illustrating a novel gas recovery device deployed below ground.

The primary purpose of the novel gas recovery device is to facilitate removal of substantially liquid free gas from subterranean gas bearing formations. FIG. 1 illustrates such a device 10 typically deployed at the lower end of a well 11. A conventional well casing 12 extends into the well hole to a depth below ground level 13 to penetrate a subterranean geological formation 14 bearing a gas 15. Locating, drilling, and deploying the casing can be accomplished with traditional methods and materials. The well may be located on dry land, as illustrated, or off-shore. In the latter instance, the product discharge transfer pipe 17 will extend to the surface of water present above ground level 13 or to a submerged product storage facility in accordance with conventional techniques.

The gas to be recovered is usually found within a subterranean geological formation which is sufficiently porous that the gas in liquid form can flow through the formation to the well for extraction. The gas may also exist in the solid state, for example as methane hydrates, which are able to liberate a mobile form of the gas through sublimation. By the term "gas" is meant a substance which exists in the gaseous state at atmospheric pressure and temperature. Gas present in the gaseous state substantially free of liquid or solid contaminants can be extracted by the novel recovery device. It is likely that the gas-bearing fluid will be present as a liquid, either as a compressed gas or as a gas mixed with a liquid. Typically, the subterranean liquid is water which may contain dissolved minerals. For purposes of this description the term "brine" is sometimes herein used to denote the liquid, non-gaseous fluid with which the recoverable gas product is mixed. The mixture of gas and brine is sometimes heterogeneous in that some of the gas exists in the geological formation as bubbles surrounded by liquid brine. Usually the gas-brine mixture is homogeneous, that is, the gaseous component to be recovered is dissolved in the brine.

Preferably the novel device will be used to recover natural gas from subterranean formations. The term "natural gas" is generally used to denote the naturally occurring underground colorless, highly flammable gaseous mixture of hydrocarbons which is frequently found with or near petroleum deposits. Typically that natural gas is composed of about 80–85% methane and about 10% ethane and a balance of propane, butane, and nitrogen. In context of this application the term "natural gas" also encompasses other hydrocarbon and non-hydrocarbon naturally occurring gas compositions such as hydrogen sulfide and carbon monoxide. The basic criteria for the applicability of the gas recovery device to a particular system of gas and liquid are (a) that the material of the separator is permeable to the gas and substantially impermeable to the liquid and (b) that the material is inert or at least strongly resistant to chemical reaction with the components of the gas and liquid. Hence, the gas recovery device can be used to separate synthetic or refined gas mixtures or pure components from a variety of liquids. By way of non-limiting examples, this invention can be utilized to separate a gas or gas mixture from solution in a liquid in a chemical process storage tank and to separate useful or noxious gases from waste water treatment ponds or septic tank liquids.

Figure 2:
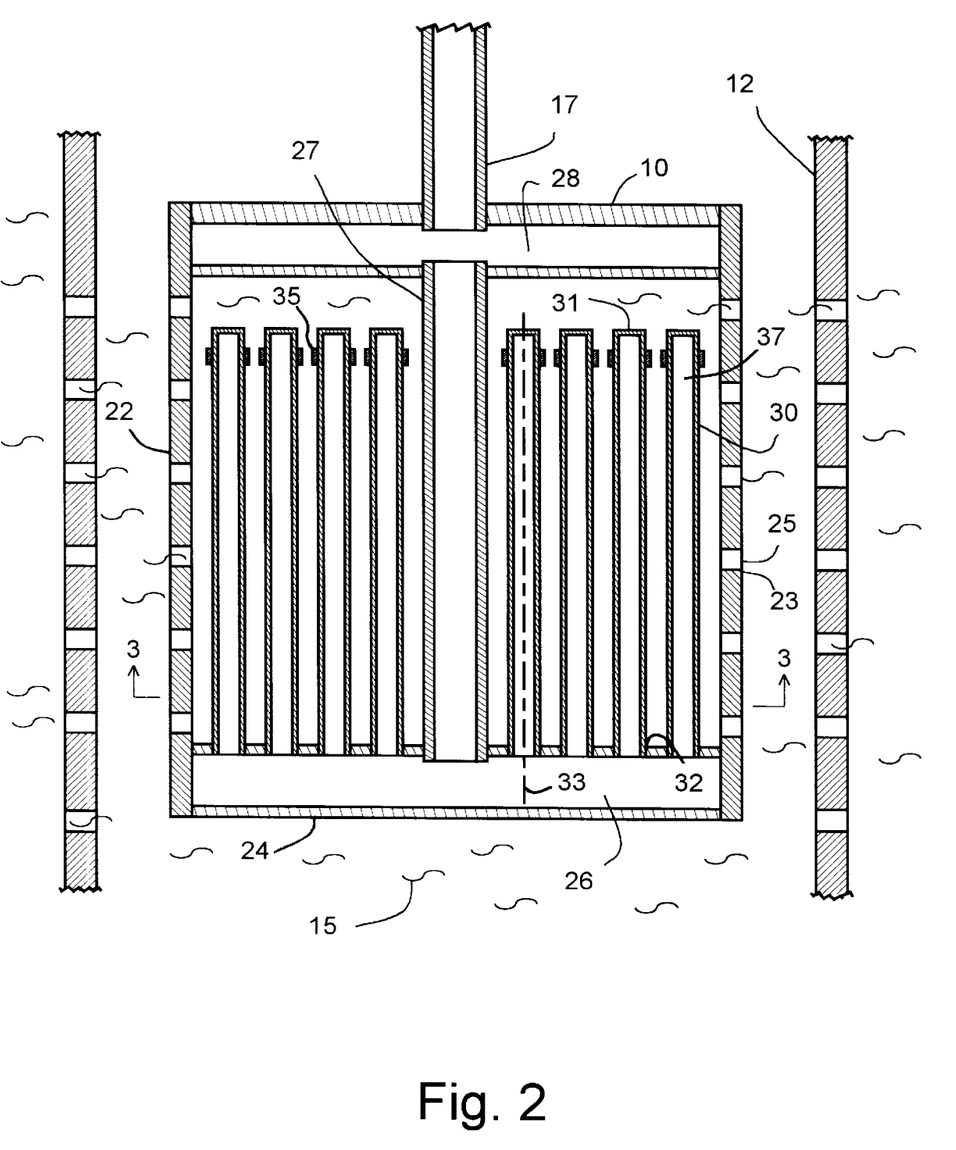
FIG. 2 is a schematic diagram of a section view of an embodiment of a gas recovery device according to this invention.

FIG. 2 shows an embodiment of the novel gas recovery device 10 in greater detail. Device 10 has a shell 22 defined by rigid exterior walls 23. The shell can be formed of robust rigid material, for example, metal, such as stainless steel, and plastic, such as fiberglass. The shape of the horizontal cross section of the shell is not critical. Preferably the cross section should be circular to provide a generally cylindrical gas recovery device which can be accommodated by circular well bores which are very common. The outer diameter of the shell can be any convenient size adapted to insert within the well casing 12. Certain of the walls in contact with the brine have a plurality of perforations 25 of a size effective to permit gas-bearing brine to flow through the walls into the shell. At the bottom of the shell is a plenum 24 that has a chamber 26 in which gas removed from the gas-bearing brine is collected prior to withdrawal through transfer pipe 27. Located in an annular space between the inside of walls 23 and the outside of transfer pipe 27 is at least one, and preferably a plurality of hollow permeation units 30. Each permeation unit 30 is adapted to carry out gas separation from the liquid and comprises a membrane of a gas permeable, liquid impermeable substance. That is, the membrane is effective to allow the gas to be recovered to transport across the membrane and to reject the liquid. Preferably, the permeation units are elongated and are tubular in shape. Notably, the lumen of each permeation unit is closed at one end 31 to form an internal cavity 37 which is connected in fluid communication with chamber 26 at the opposite end 32. Various methods of attaching the end 31 to the plenum 24 can be used. For example, ends of tubes 30 can be potted in an appropriately adhesive thermosetting resin, such as epoxy resin. After setting, the resin is cut perpendicular to the axes of the tubes to form a tube sheet that can be assembled to form a bulkhead of the plenum. Another representative method involves inserting an inelastically deformable ferrule inside the end of the tube. The ferrule can then be expanded radially outward against the interior wall of a predrilled hole in the bulkhead to pinch the tube between the ferrule and wall.

In the illustrated embodiment, the shell of the gas recovery device is disposed substantially centrally in vertical orientation inside the well casing 12. An optional standard packing gland 14 (FIGS. 4, 4A and 5) provides a barrier to prevent flow of liquid, symbolically represented in the figures by element 15, above the device in the well casing. This stops the liquid from rising to such an elevation inside the casing that might produce too great a hydrostatic back pressure of the liquid at the level of the device. Excessive back pressure tends to reduce the rate of gas transport through the membrane.

Transfer pipe 27 is in fluid communication with an intermediate storage chamber 28 where product gas collects prior to discharge up the well shaft via product discharge pipe 17 for storage, further refinement and ultimately for use. The intermediate storage chamber is optional. In another embodiment seen in FIG. 5, cylindrical walls 53 of the gas recovery device extend upward and define screw threads 55 adapted to mate with threads of well pipe 57. Thus the lumen of transfer pipe 27 is in communication with the lumen 58 of well pipe 57, which extends to a remote location intended to receive the product gas. The well pipe 57 serves as the conduit for product gas as well as physical support for the gas recovery device.

In another embodiment, not shown, the gas recovery device can be oriented at an angle other than vertical. For example, the shell of the device can be oriented horizontally for insertion in a horizontal well channel.

Figure 3:
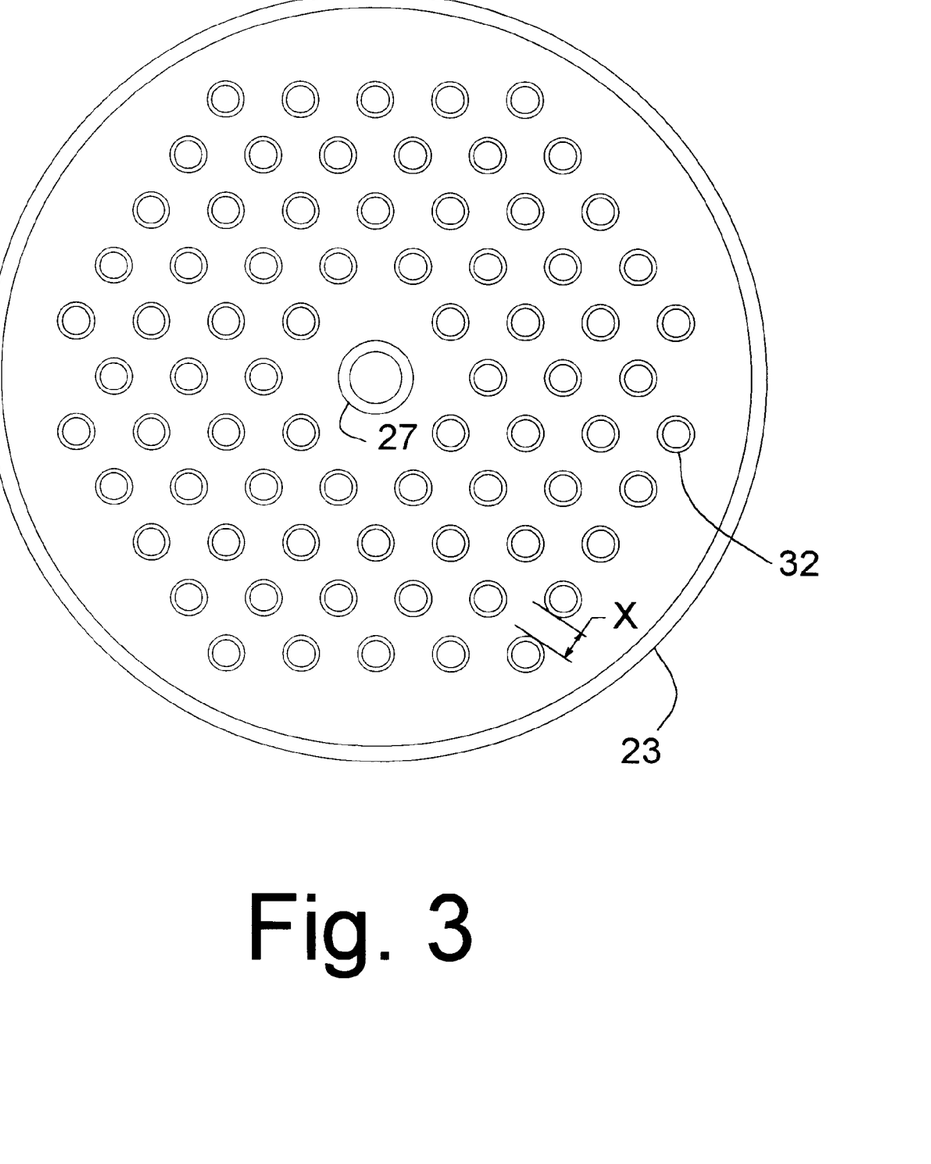
FIG. 3 is a view of the gas recovery device taken along line 3—3 of FIG. 2.

Preferably the plurality of the hollow, tubular permeation units within the gas recovery device are disposed substantially parallel to each other and to the transfer pipe as seen in FIG. 2. FIG. 3 shows a typical lateral arrangement of the multiple permeation units of device 10 of FIG. 2. Ideally the permeation units 30 are laterally spaced apart from each other by a minimum spacing dimension x between adjacent tubes, the transfer pipe 27 and interior surface of wall 23. The minimum spacing dimension provides a zone around each unit in which gas-containing brine can circulate and contact the outer surface of the tubes. A minimum spacing dimension of about 0.1–1 times the outer cross section dimension of the permeation units is desirable and about 0.25–0.75 is preferred. The permeation units can be spaced apart greater than the preferred minimum spacing dimensions, however, the more distant the units are from each other, the fewer units will fit in any given size gas recovery device. The tubes are preferably positioned laterally according to a predefined spacing pattern. Preferably an ordered pattern is designed to provide the largest number of permeation unit tubes in the device consistent with the minimum spacing dimension. Hence, for any given length of permeation unit tube, the total surface area of permeation units available for gas transfer is maximized.

Importantly, each permeation unit is physically affixed to the plenum, and thus, to the shell at only one extremity 32 and the remainder of the elongated permeation unit is free of attachment to the shell. This feature coupled with selection of structurally compatible materials and dimensions of the permeation units, advantageously permits the tubes to flex slightly along the axis of tube elongation 33 (FIG. 2). As will be more fully described below, the ability of the tubes to flex enables them to deflect radially from the axis of elongation to provide a beneficial agitation of the brine surrounding the tubes. The extent of potential deflection increases with axial distance from the plenum at which point, of course, the deflection is zero. Hence, maximum deflection may occur at the free, closed extremity 31 of the tubes. The tubes can be so lacking in stiffness that they fall limply onto the plenum when not in use. Such tubes conform to the configuration seen in FIG. 2 when the gas recovery device is immersed in brine as will be explained. Due to buoyance of the permeation units, the tubes float (or in other embodiments sink) into parallel alignment.

A spacer 35 can be optionally affixed to protrude radially outward from the outer surface of at least one permeation unit tube to limit the radial deflection so that the tubes remain at least the minimum spacing dimension x apart over the major fraction of their lengths. Preferably a plurality of permeation units will have spacers. The spacers reinforce the tubes at points of mutual contact, thereby diminishing the destructive effect of repeated collisions between tubes and extending tube life. They also may reduce the likelihood that tubes will become entangled. The spacers can be deployed at any axial position along the tubes. Preferably the spacers should be placed in the region from mid-length to the free end 31 of the tubes. Multiple spacers can be placed on each tube. The spacers can be separate ring-shaped pieces that are mechanically attached to the tubes, or they can be an integral part of the tube itself. For example, the permeation tubes can have an outer corrugated axial profile, the peaks of which function as spacers.

The permeation unit membrane can be of any composition which is permeable to the gas to be recovered yet is substantially impermeable to the liquid from which the gas is to be separated. The term "substantially impermeable" is used to mean that under normal operating conditions some liquid may transfer across the membrane and usually the liquid transmembrane flux occurs at a negligible rate. When installed in certain geological formations, for example, deep wells and geopressurized wells, large pressure gradients can exist across the membrane. This condition is likely to cause liquid to slowly penetrate the membrane. Liquid penetration may also result when a porous membrane composition is employed. Some accumulation of liquid in the separated gas can be tolerated. After a time, liquid may collect in the plenum, the transfer pipe and the product discharge pipe. When too much liquid accumulates, it can be removed by various methods including siphoning, pumping, and draining to the surface or another distant location and backflushing through the membrane. Some liquid that reaches the plenum can entrain in the product gas flowing through the product discharge transfer pipe. The amount of entrainment will depend upon a variety of factors such as the dimensions of the plenum, shell, transfer pipe, permeation units, etc., of the device, the flow rate of product gas and the amount of liquid present. Consequently, some liquid may exist in the collected product and some subsequent liquid removal by conventional means may be desirable to produce a dry gas product.

Preferably the membrane composition is polymeric. Polymers suitable for the membrane can include polysiloxanes, polysulfones, polyurethanes, polyamines, polyimines, polyamides, acrylonitrile-containing copolymers, polyalkyl acrylates, polyalkyl methacrylates, polyesters, polyetheretherketone ("PEEK"), cellulosic polymers, polyalkylene glycols, polyolefins and halogen substituted polyolefins, polyvinyl alcohols, polystyrenes and copolymers and mixtures thereof. Representative halogen substituted polyolefins include polytetrafluoroethylene ("PTFE"), perfluoroalkylvinyl ether polymer ("PFA"), fluorinated ethylene-propylene copolymer ("FEP"), such as tetrafluoroethylene-hexafluoropropylene copolymer, ethylene-tetrafluoroethylene copolymer ("ETFE") and polyvinylidene fluoride ("PVDF").

The membrane can be non-porous or porous. Porous membranes can be woven fabric, non-woven fabric and open cell foam, for example. Usually to avoid excessive transmission of liquid, the pore size of gas permeable porous membrane should be smaller than about 10 $\mu$m, more preferably within the microporous range less than about 1 $\mu$m, and especially in the range of about 10–100 nm. Gas permeable membrane compositions and structures described by Henis et al. in U.S. Pat. No. 4,230,463, the complete disclosure of which is herein incorporated by reference, are also suitable for use. Generally, Henis et al. describe gas permeable membranes of microporous substrates of a first gas permeable polymer coated with a second gas permeable polymer in a way that the second polymer penetrates the pores of the substrate to form an overall, non-porous, yet still gas permeable, membrane.

Figure 5:
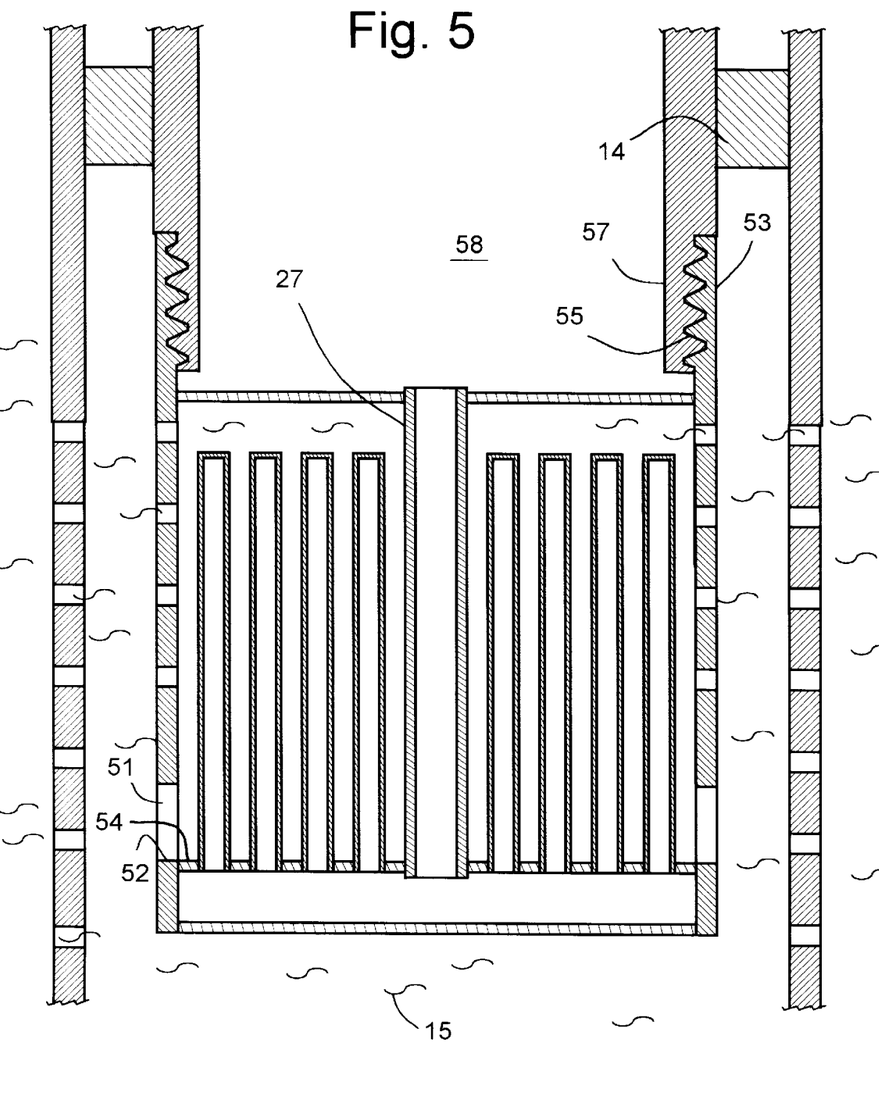
FIG. 5 is a schematic diagram of a section view of another embodiment of a gas recovery device according to this invention.

Particularly preferred for the permeation units of this invention are tubes of expanded polytetrafluoroethylene ("ePTFE"). This material is polytetrafluoroethylene in a microporous form initially developed by W. L. Gore and Associates, Elkton, Md. under the tradename "Goretex". Tubing of ePTFE is commercially available. Preferably the outer diameter of the tubes should be in the range of about 1/8 inch (~3 mm) to about 1/2 inch (~13 mm), and more preferably 1/4 inch (~6 mm) to 1/2 inch (~13 mm). Preferred wall thickness of the tubes is in the range of about 1/16 inch (~1.6 mm) to about 3/16 inch (~4.8 mm). Such tubes of ePTFE are known to float in water and thus are ideal for use in the novel gas recovery device configured with upward extending permeation units as shown in FIGS. 2 and 5.

In operation, the gas recovery device is positioned within a well casing in fluid connection with a product discharge pipe as shown in FIGS. 1 and 2. It is lowered to a depth at which the device is immersed in the gas-containing brine which flows into the well casing from formation 15 through casing holes 16. The gas-containing brine thus surrounds the recovery device and penetrates into the region around the permeation tubes through perforations 25. By virtue of the ability of the membrane to permeate gas but not liquid, gas in contact with the outer surfaces of the permeation tubes transports into the internal cavities of the tubes. As the process continues, additional gas fills the tubes and collects in the plenum. As the volume of gas increases, the substantially liquid-free excess is displaced from the chamber of the plenum through the transfer and product discharge pipes to a remote collection facility. Fresh, gas-containing brine from the geological formation flows into the well casing and mixes with degassed brine therein to continue the separation process.

While the gas permeates the membranes, eddy currents induced by the gas transfer and from natural flow of the brine within the geological formation cause the tubes to deflect about their axes of elongation. If spacers are present, the extent of deflection will be limited by contact of spacers of a tube with spacers of neighboring tubes. Deflection of the tubes produces a further agitation of the brine within the shell of the gas recovery device. This agitation disturbs the boundary conditions obtaining on the outer surfaces of the tubes in such a way that is believed to promote the permeation of the gas through the membranes. For example, stirring motion of the tubes reduces the effective boundary layer of stagnant brine at the tube surfaces which permits fresh gas-containing brine to contact the gas separation membrane.

Solid particles, such as dirt, clay and/or precipitated minerals, may be entrained in the subterranean brine. As gas permeates the membranes, these solids can interfere with transmembrane gas flow by clinging to the outer surfaces of the tubes. The motion of the flexible tubes causes them to jostle and brush against each other. This helps to clean solids from the outside of the tubes to a larger extent than would occur if the tubes were stationary.

Solid particles in the brine that are brushed from membrane surfaces by agitating action of the tubes are likely to accumulate within the shell over time and might eventually fill the interstices between tubes. This reduces the area available for further permeation. This problem has been largely solved by enlarging the perforations 51 near the bottom of the shell of the device as seen in FIG. 5. To further facilitate the expulsion of accumulated sediment, the bottom 52 of the enlarged perforations can be made flush to the top surface 54 of the plenum.

Figure 4:
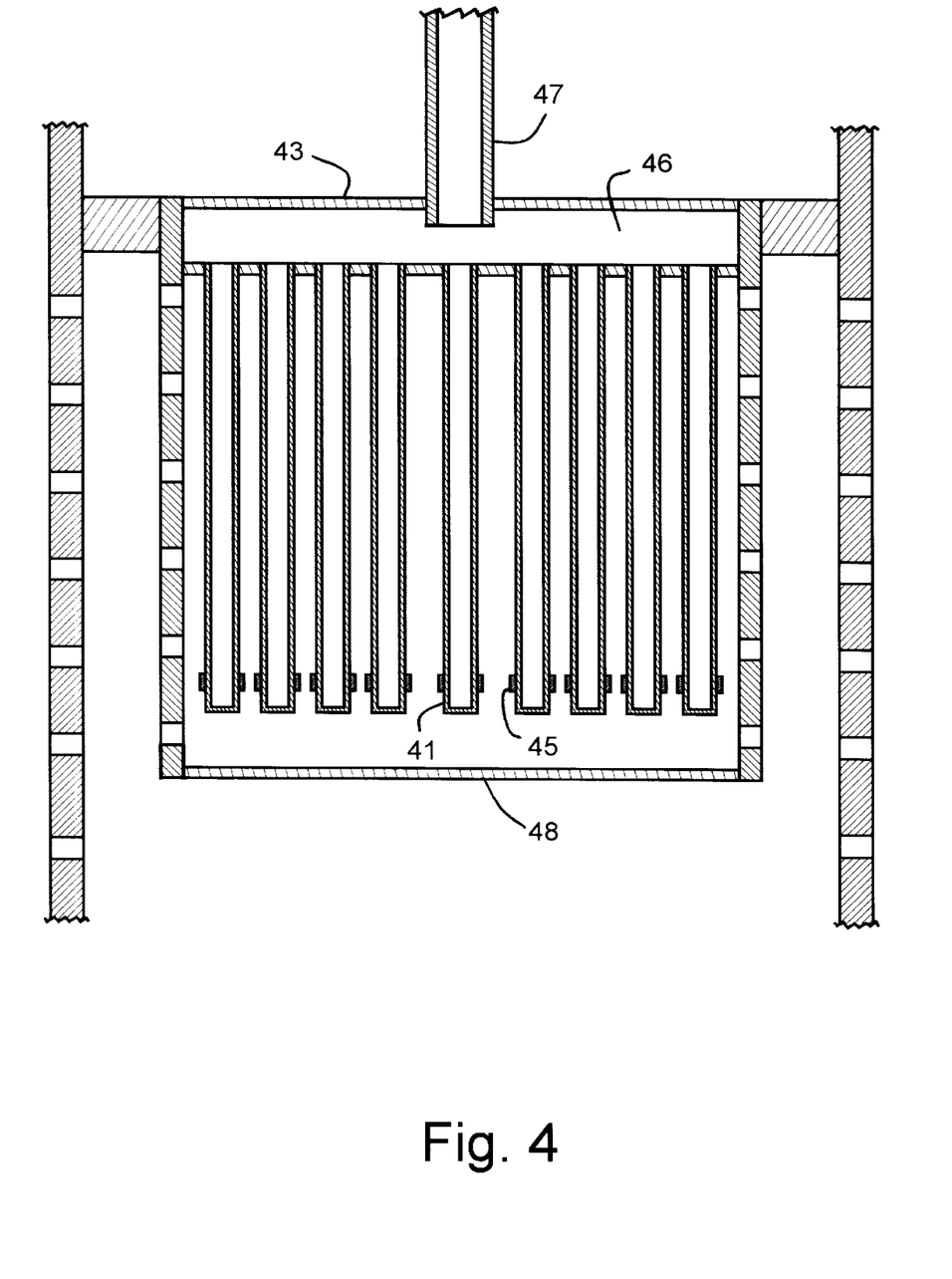
FIG. 4 is a schematic diagram of another embodiment of the novel gas recovery device according to this invention.

Although specific forms of the invention have been selected for illustration in the drawings and the preceding description is drawn in specific terms for the purpose of describing these forms of the invention fully and amply for one of average skill in the pertinent art, it should be understood that various substitutions and modifications which bring about substantially equivalent or superior results and/or performance are deemed to be within the scope and spirit of the following claims. For example, the transfer pipe 27 (FIG. 2) can be positioned eccentrically, and/or replaced or supplemented with a plurality of smaller diameter transfer pipes. Also, as shown in FIG. 4, in a further contemplated embodiment the plenum 46 can be positioned at the upper end 43 of the gas recovery device shell. Also, for permeation units of composition that is buoyant in brine, the spacers 45 can be weighted to cause the units to hang downward. It is also seen that a transfer pipe can be eliminated because the plenum 46 can communicate directly with the product discharge pipe 47 at the top of device shell. The volume of the shell formerly occupied by the central header pipe is made available for installation of one or more additional permeation units, collectively schematically represented by element 41. Thus suspending the permeation units from the top of the device provides an increase of gas transfer area. As a further option, protective plate 48 can be removed from the downward-hanging permeation unit configuration of FIG. 4. This exposes the ends of the permeation units directly to the bore of the well casing, albeit within the sidewalls of the gas separation device. However, this option facilitates the self-cleaning feature of the device by providing an avenue for particulates brushed off the outer surfaces of the permeation units to fall downward and away from units and thus reducing the extent of clogging that such particulates might otherwise cause in an enclosed device having protective plate 48 present.

Figure 4A:
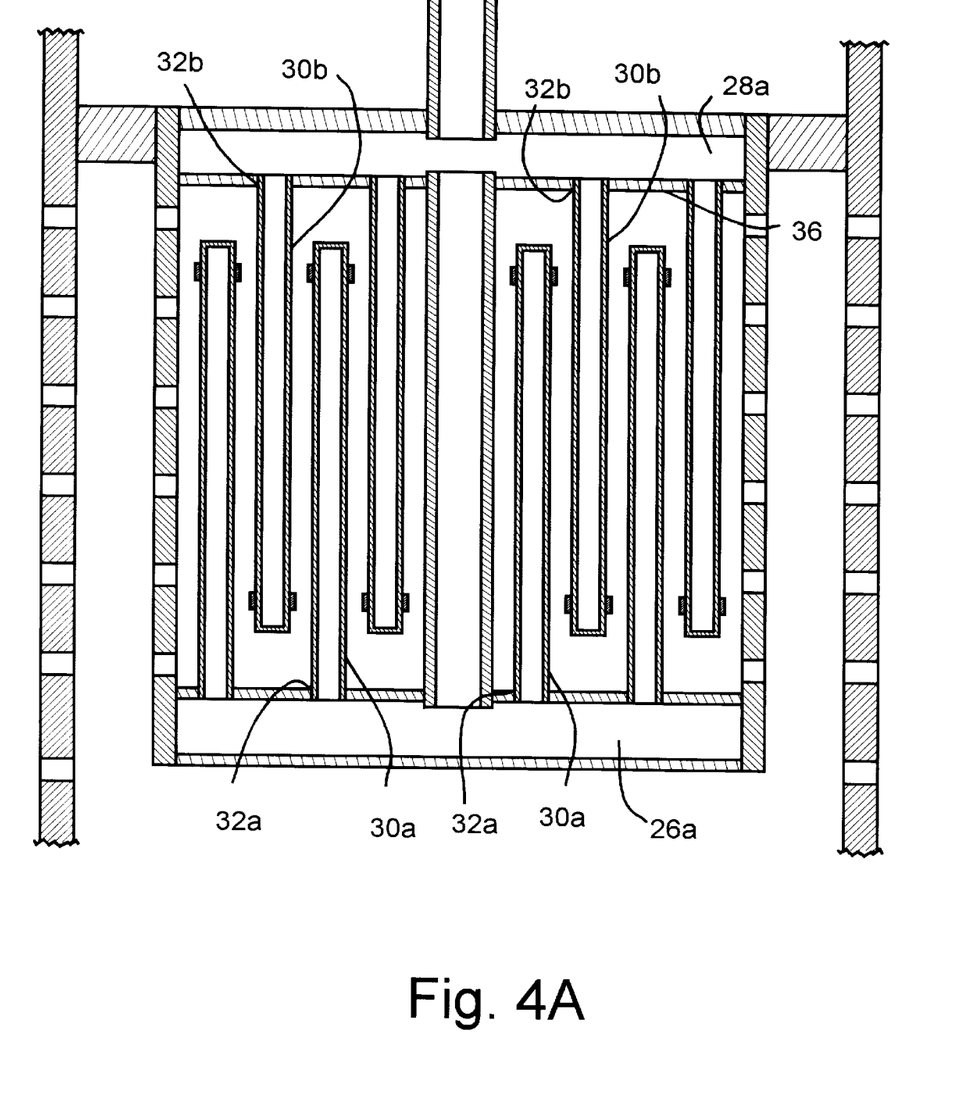
FIG. 4A is a schematic diagram of another embodiment of the novel gas recovery device according to this invention.

Still further there is contemplated an embodiment, not shown, in which a horizontal plenum is positioned vertically intermediate the top and bottom of the shell. In such embodiment, both floating units extending upward from the top of the plenum and weighted units hanging downward from the bottom of the plenum can be deployed in a single gas recovery device. Yet another contemplated variation is illustrated in FIG. 4A. In this embodiment the plenum 26a is positioned at the bottom of the shell. A selected number of permeation units 30a composed of buoyant material are affixed at one extreme 32a to the plenum so as to float upward. The remainder of permeation units 30b composed of weighted material are affixed at one extreme 32b to the bulkhead 36 of intermediate storage chamber 28a. The weighted permeation units 30b thus hang downward from the bulkhead and are disposed in the interstices between the floating permeation units 30a. In yet another variation, the shell 22 (FIG. 2) can be omitted so that the elongated permeation units are exposed directly to the brine within the well casing without the protective armor of the perforated shell being present. This embodiment is potentially less expensive than armored embodiments and may increase the gas production rate by allowing fresh brine to contact the gas permeable membrane without having to first intrude into a shell surrounding the permeation units.

Figure 6:
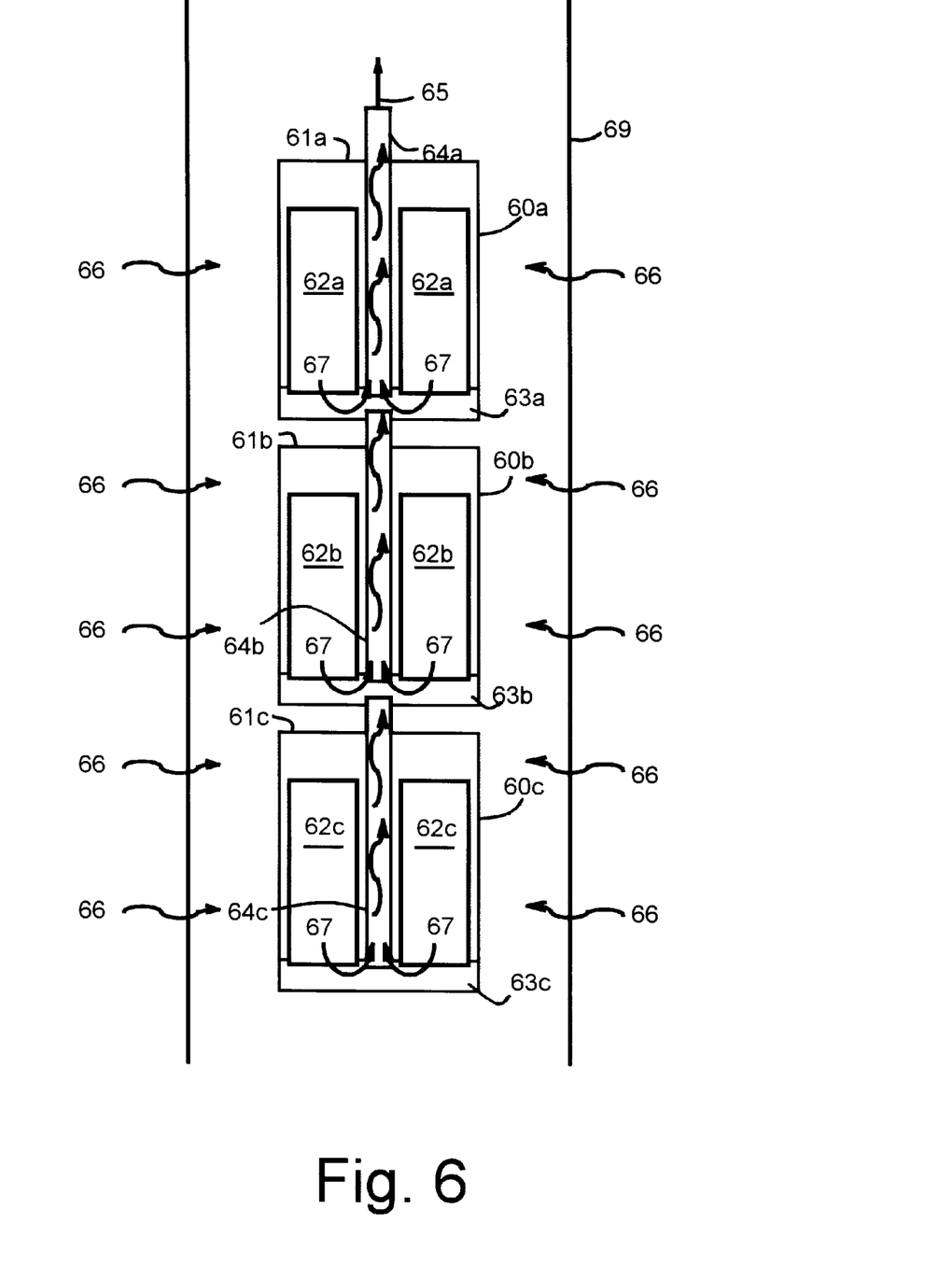
FIG. 6 is a schematic diagram of an apparatus comprising a multiplicity of gas recovery devices arranged in a stacked configuration according to this invention.

In another aspect, the present invention calls for an apparatus comprising a plurality of interconnected gas recovery devices. A preferred embodiment is shown schematically in FIG. 6 to include three recovery devices 60a, 60b and 60c interconnected in a vertically stacked configuration positioned within a vertical well casing 69. Each device comprises shell 61a,b,c, a plurality of vertically oriented, elongated permeation units, 62a,b,c and a plenum 63a,b,c below and connected in fluid communication with the internal cavities of the respective permeation units. Each device further comprises a central product collection header pipe 64a,b,c. The upper end of the header pipe 64c of lowermost device 60c extends upward into the plenum 63b of next above recovery device 60b. Similarly, header pipe 64b extends upward into plenum 63a of recovery device 60a. Any number of recovery devices can be strung together. The illustrated embodiment shows the uppermost recovery device 60a discharging product gas from its central header 64a to the remote product collection point through a product discharge transfer line 65. In use, fluid flows through the apparatus in paths indicated by referenced arrows as will now be described. Brine 66 bearing gas intrudes into the well casing 69 through perforations (not shown) and passes into the shells 61a,b,c to surround and contact the gas permeable membranes of permeation units 62a,b,c. Gas which permeates the membranes descends from the permeation units into each plenum 67 where it collects and joins with gas flowing upward from lower recovery devices and is finally discharged to remote storage and use facilities via product pipe 65. The devices can be joined together in a string by connecting gas transfer pipes as seen in FIG. 6 or by joining adjoining adjacent shells utilizing threaded fastening techniques as in FIG. 5, for example.

In a different embodiment, the plurality of gas recovery devices can be interconnected in a parallel configuration in which gas transfer pipes from multiple devices feed into a common product pipe which leads away from the apparatus toward a remote facility. For example, the devices can be arranged in a "hub and spoke" configuration in which the multiple devices are oriented either horizontally or vertically and are positioned at the rim of a wheel-like, circular geometry. The individual devices are connected by transfer pipes directed radially like wheel spokes toward a central, common discharge transfer pipe at the hub location. Such parallel configuration is suited to removing gas from shallow formations, ponds and pools.

Because the gas recovery device does not consume external energy, it can function effectively for long periods. It can produce substantial quantities of gas from wells which are not productive for various reasons, such as the gas concentration mixed with the brine is too low for traditional gas recovery methods to operate economically, the water flow is too great and/or the water pressure is too high. Also, the recovered gas is substantially free of liquid, very little post extraction refining typically is needed before the gas is consumed.

What is claimed is:

1. A process for recovering gas from a fluid of gas and liquid in intimate mutual contact comprising the steps of
providing a gas recovery device comprising
a plenum defining a chamber adapted to contain a gas,
at least one permeation unit comprising a gas permeable, liquid substantially impermeable membrane and having an elongated shape defining two ends and an internal cavity adapted to receive gas transported through the membrane and which permeation unit is affixed to the gas recovery device only at one of the two ends which end is operative to transfer gas from the internal cavity to the chamber, and
a gas transfer pipe in fluid communication with the chamber and extending away from the plenum
immersing the gas recovery device in the fluid of gas and liquid thereby permitting the fluid to contact one side of the membrane,
maintaining contact of the fluid with the membrane to selectively transport gas substantially free of liquid through the membrane into the internal cavity,
allowing the gas transported through the membrane to flow into the plenum, and
removing the gas through the pipe.

2. The process of claim 1 in which the gas recovery device comprises a plurality of permeation units, each unit comprising a flexible tube characterized by an axis of elongation, and in which the process concurrently with the maintaining contact step further comprises the step of permitting the tubes to flex freely along the axis of elongation thereby agitating the fluid in contact with the membrane and promoting transmembrane flow.

3. The process of claim 2 in which the membrane comprises expanded polytetrafluoroethylene.

4. The process of claim 2 which the immersing step further comprises inserting the gas recovery device into a well casing of a subterranean well.

5. A process for recovering gas from a well situated in communication with a subterranean fluid of gas and liquid comprising the steps of
providing a gas recovery device comprising
a vertically oriented, cylindrical shell having rigid walls which define perforations of size effective to pass liquid into the shell,
a plenum defining a chamber adapted to contain a gas,
a plurality of permeation units each of which comprises
a gas permeable, liquid substantially impermeable membrane consisting essentially of a tube of expanded polytetrafluoroethylene having two tube ends and an internal cavity within the tube adapted to receive gas transported through the membrane and which permeation unit is affixed to the gas recovery device only at one of the two tube ends which end is operative to transfer gas from the internal cavity to the chamber, and
a gas transfer pipe in fluid communication with the chamber and extending away from the plenum,
suspending the gas recovery device from above ground level into the well with a gas product pipe having a lumen in fluid communication with the gas transfer pipe,
maintaining the gas recovery device at a depth effective to immerse the device in the subterranean fluid, thereby causing the fluid to enter the shell through the perforations,
contacting the outside of the tubes with the fluid to selectively transport gas substantially free of liquid through the membrane and into the plenum, and
removing the gas through the gas transfer pipe and gas product pipe above to a remote location.

6. A gas recovery device comprising
a plenum defining a chamber adapted to contain a gas,
a plurality of permeation units comprising a gas permeable, liquid substantially impermeable membrane and having an elongated shape of a cylindrical tube characterized by an axis of elongation defining two ends and an internal cavity adapted to receive gas transported through the membrane and which permeation unit being adapted to flex along the axis without occluding the internal cavity is affixed to the gas recovery device only at one of the two ends which end is operative to transfer gas from the internal cavity to the chamber and in which the tube is closed at the second of the two ends,
a rigid shell enclosing the plenum and the permeation units, the shell having perforated walls adapted to admit a liquid from outside the shell in contact with a side of the gas permeable, liquid substantially impermeable membrane opposite the internal cavity, and
a gas transfer pipe in fluid communication with the chamber and extending away from the plenum.

7. The device of claim 6 in which the shell is elongated to define a first shell end and a second shell end and the tubes are positioned to extend away from the plenum in substantially parallel alignment to the shell.

8. The device of claim 7 in which the plenum is positioned intermediate of the shell ends.

9. The device of claim 7 in which the plenum is positioned at one of the shell ends.

10. The device of claim 9 in which the gas transfer pipe extends outward from the shell end at the plenum.

11. The device of claim 10 in which the membrane comprises expanded polytetrafluoroethylene.

12. The device of claim 10 in which the unit comprises a composite of a layer of a gas permeable, liquid substantially impermeable membrane bonded to a porous support layer of polymer or metal.

13. The device of claim 9 which the gas transfer pipe passes within the shell from the plenum to the shell end distant from the plenum.

14. The device of claim 13 in which the gas transfer pipe extends outward from the shell end distant from the plenum.

15. The device of claim 9 which further comprises an intermediate gas storage chamber within the shell at a shell end distant from the plenum, and a header pipe adapted to join the intermediate storage chamber in fluid communication with the plenum.

16. The device of claim 15 in which some of the permeation units are affixed to the device by one end attached to the plenum and all other permeation units are affixed to the device by one end attached to the intermediate gas storage chamber.

17. The device of claim 6 in which the permeation units have an outer surface and at least one permeation unit comprises a radially outward protruding spacer on the outer surface.

18. The device of claim 17 in which a plurality of permeation units comprise radially outward protruding spacers.

19. The device of claim 17 in which the at least one permeation unit comprises a plurality of radially outward protruding spacers on the outer surface and the spacers are positioned apart from each other along the axis of elongation.

20. The device of claim 17 in which the spacer has a buoyancy in a gas-containing liquid selected to cause the permeation unit of a device immersed in the liquid to extend in a direction upward or downward from the plenum.

21. A gas recovery apparatus comprising a common product gas discharge transfer pipe and a plurality of gas recovery devices, each device comprising a plenum defining a chamber adapted to contain a gas, at least one permeation unit comprising a gas permeable, liquid substantially impermeable membrane and having an elongated shape defining two ends and an internal cavity adapted to receive gas transported through the membrane and which permeation unit is affixed to the gas recovery device only at one of the two ends which end is operative to transfer gas from the internal cavity to the chamber, and a gas transfer pipe in fluid communication with the chamber and extending away from the plenum, in which the gas transfer pipe of each device is in fluid communication with the common product gas discharge transfer pipe.

22. The gas recovery apparatus of claim 21 in which the gas recovery devices are connected sequentially so that the gas transfer pipe of at least one gas recovery device communicates with the chamber of the plenum of a sequentially adjacent gas recovery device.

23. A gas recovery system comprising a well situated in communication with a subterranean fluid of gas-containing liquid, and a gas product pipe suspended from above the well, at least one gas recovery device affixed to the product pipe within the well and positioned at a depth effective to be immersed in the subterranean fluid, the gas recovery device comprising a cylindrical shell having rigid side walls having perforations of size suitable to pass the subterranean fluid therethrough, a plenum within the shell defining a chamber adapted to contain a gas and extending substantially completely over a radial cross section of the shell, and at least one permeation unit comprising a gas permeable, liquid substantially impermeable membrane and having an elongated shape defining two ends and an internal cavity adapted to receive gas transported through the membrane and which permeation unit is affixed to the gas recovery device only at one of the two ends which end is operative to transfer fluid from the internal cavity to the chamber, and connecting means for conducting gas from the chamber to the gas product pipe.

24. The system of claim 23 in which the gas recovery device comprises a plurality of permeation units, each unit comprising a cylindrical tube characterized by an axis of elongation and closed at the second of the two ends, the permeation unit being adapted to flex along the axis without occluding the internal cavity.

25. The system of claim 24 in which the membranes of the permeation units comprise expanded polytetrafluoroethylene.

26. The system of claim 24 in which the shell is oriented vertically and the permeation units extend away from the plenum in substantially parallel alignment to the shell.

27. The system of claim 26 in which the plenum is at the bottom of the shell and the permeation units extend upward from the plenum within the shell.

28. The system of claim 26 in which the plenum is at the top of the shell and the permeation units extend downward from the plenum within the shell.

29. The system of claim 23 which comprises a plurality of gas recovery devices connected sequentially in a vertical stack by a gas transfer pipe between each vertically adjacent pair of gas recovery devices which transfer pipe extends in fluid communication from the chamber of the plenum of one gas recovery device in the pair to the chamber of the plenum of the other gas recovery device of the pair.

30. A gas recovery device comprising a plenum defining a chamber adapted to contain a gas, at least one permeation unit comprising a gas permeable, liquid substantially impermeable membrane and having an elongated shape characterized by an axis of elongation defining two ends and an internal cavity adapted to receive gas transported through the membrane and which permeation unit being adapted to flex along the axis without occluding the internal cavity is affixed to the gas recovery device only at one of the two ends which end is operative to transfer gas from the internal cavity to the chamber, and a gas transfer pipe in fluid communication with the chamber and extending away from the plenum, in which the membrane comprises a polymer selected from the group consisting of polysiloxanes, polysulfones, polyurethanes, polyamines, polyimines, polyamides, acrylonitrile-containing copolymers, polyetheretherketone, polyalkyl acrylates, polyalkyl methacrylates, polyesters, cellulosic polymers, polyalkylene glycols, polyolefins and halogen substituted polyolefins, polyvinyl alcohols, polystyrenes and copolymers and mixtures thereof.

31. The device of claim 30 in which the membrane comprises a microporous halogen substituted polyolefin selected from the group consisting of polytetrafluoroethylene, perfluoroalkylvinyl ether polymer, tetrafluoroethylene-hexafluoropropylene copolymer, ethylene-tetrafluoroethylene copolymer and polyvinylidene fluoride and mixtures thereof.

* * * * *

UNITED STATES PATENT AND TRADEMARK OFFICE
CERTIFICATE OF CORRECTION

PATENT NO.    : 6,228,146 B1  
DATED         : May 8, 2001  
INVENTOR(S)   : Don R. Kuespert It is certified that error appears in the above-identified patent and that said Letters Patent is hereby corrected as shown below:

Column 11, claim 13,  
Line 1, before "which" insert -- in --.

Signed and Sealed this

Fifth Day of February, 2002

Attest:

JAMES E. ROGAN  
*Director of the United States Patent and Trademark Office*

*Attesting Officer*